Dec. 16, 1947.    H. H. PLATT    2,432,677
ROTOR CONTROL IN ROTATING WING AIRCRAFT
Filed Sept. 14, 1943    2 Sheets-Sheet 2
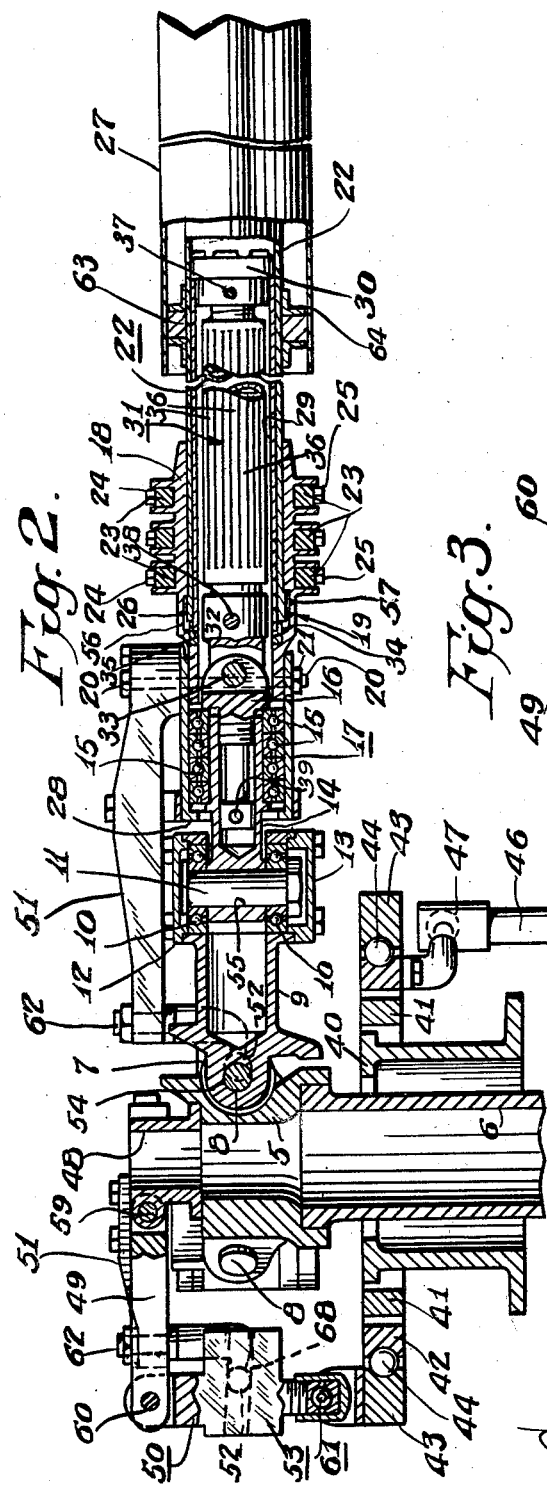
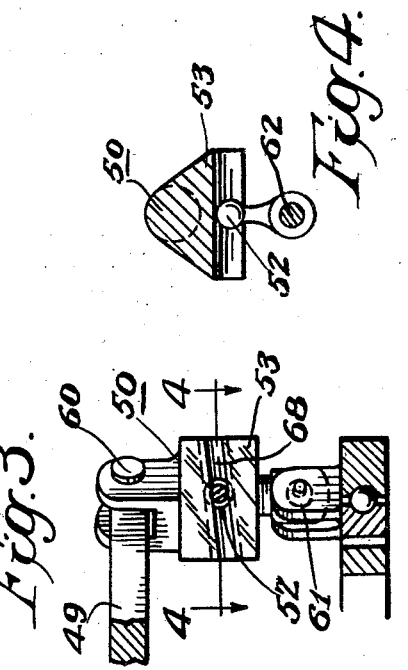
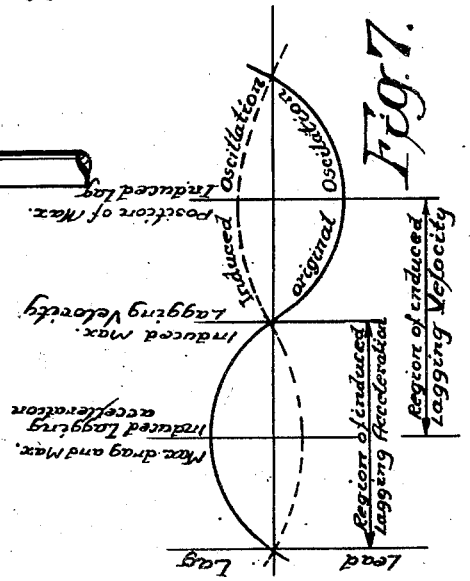
INVENTOR
Haviland H. Platt
BY
Leonard L. Kalish
ATTORNEY.

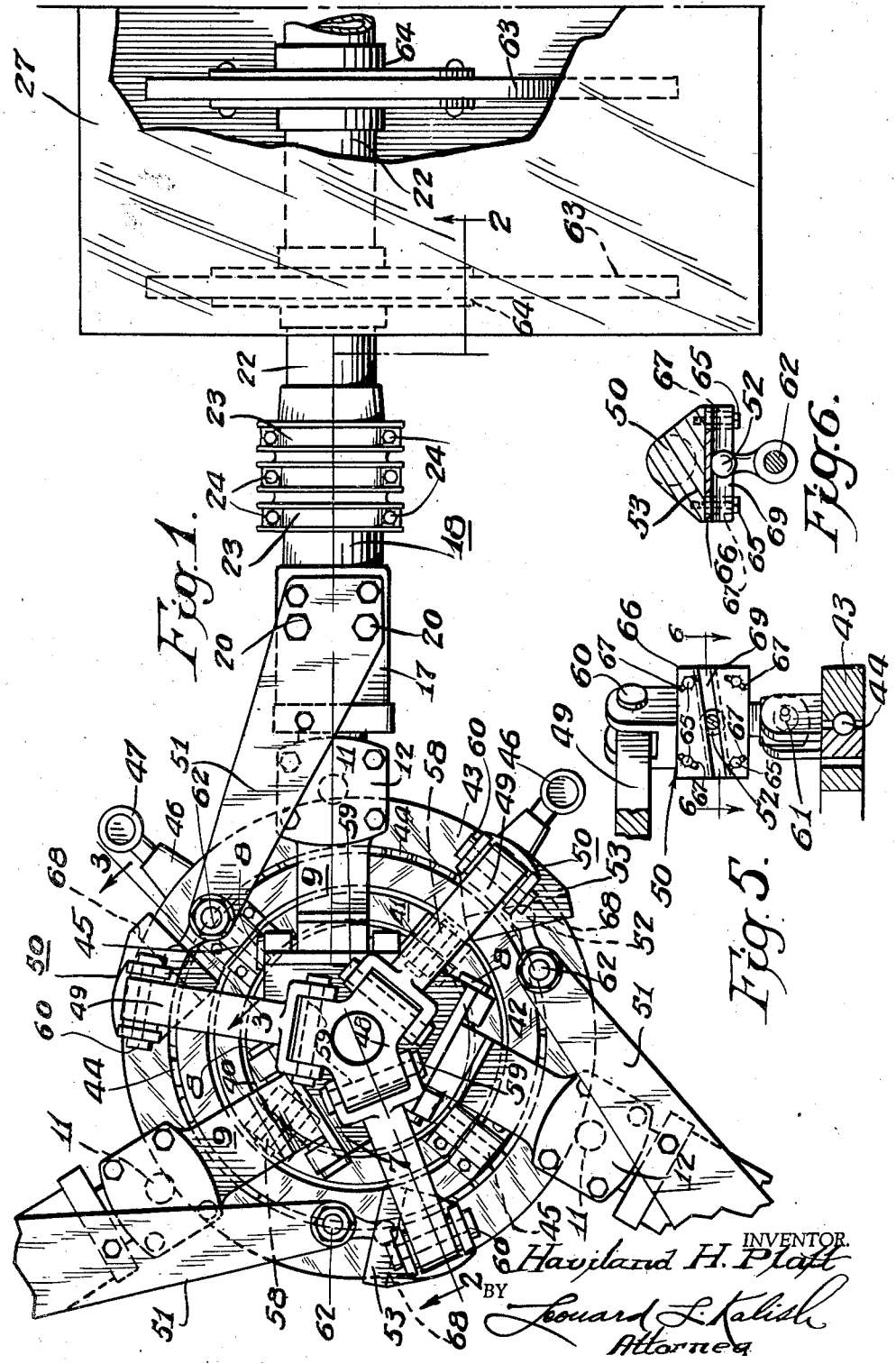

Patented Dec. 16, 1947

2,432,677

UNITED STATES PATENT OFFICE 2,432,677

ROTOR CONTROL IN ROTATING WING AIRCRAFT

Haviland H. Platt, New York, N. Y., assignor, by mesne assignments, to McDonnell Aircraft Corporation, St. Louis, Mo., a corporation of Maryland Application September 14, 1943, Serial No. 502,246

16 Claims. (Cl. 244—17)

The present invention relates to airscrews and its relates more particularly to lifting rotors of aircraft which derive their chief sustentation from generally vertically directed airscrews, either power driven or actuated by relative airflow. More specifically, the present invention is concerned with the control and regulation of the pitch of the blades of rotors which are universally articulated, that is whose blades are so mounted that they are free to lag and flap and to turn on their own axes.

It has been common practice to provide rotor blades with horizontal or flap pivots permitting up and down moving or flapping motions, and with vertical or lag pivots permitting horizontal swinging or lagging motions, as well as with bearings permitting the blades to rotate on their own axes so as to change their pitch or angle of incidence. Means have commonly been provided for controlling the pitch changing motions of such blades so as to impart to them oscillatory or cyclic pitch change in time with the frequency of rotation of the rotor for the purpose of controlling the direction of combined thrust of the rotor. Various means of interconnecting the blade pitch changing motion with the blade lagging motion and/or the blade flapping motion have previously been proposed.

It has been found in practice that the smooth and stable operation of articulated rotors is dependent to a great degree on the establishment and precise maintenance of certain relationships between lag, flap, and pitch, which relationships have not been established or maintained over the operating range of motion in any of the rotor control and regulating devices heretofore known. The lack of correct regulation in rotors equipped with conventional control and regulating devices has led to very serious operational defects, such as, for example: roughness of operation, instability of control and of flight, and destructive self-resonance.

One object of my invention is to provide novel means for cyclic pitch control of rotor blades which is capable of providing correct relations of pitch to lag and to flap in all operating positions of the blades.

Another object of my invention is to provide novel means interconnecting the pitch and lag angles of a rotor blade such that an anti-resonant tendency is established for all operating positions of the blade.

Still another object is to provide novel means for improved vertical positional stability for helicopters equipped with articulated rotors.

A still further object of my invention is to provide novel means insuring improved response to throttle control in helicopters equipped with articulated rotors.

With these and other objects and advantages in view which will appear more fully from the following detailed description, appended claims and accompanying drawings, the present invention includes, in a rotor, a novel disposition of pitch control linkage providing parallel motion of the control links, together with slotted cams mounted on said links and cooperating with ball-ends or spherical roller-ends of pitch-actuating arms attached to the blades so as to control the pitch motions thereof in accordance with the form and disposition of the slotted cams.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangements and proportions herein shown and described.

Referring to the accompanying drawings in which like reference characters indicate like parts throughout:

Figure 1 represents a top plan view of a helicopter rotor hub, with its control parts and with one blade attached, illustrating the interlinkage of my invention.

Figure 2 represents a horizontal cross-sectional view generally along line 2—2 of Figure 1 further illustrating the disposition of the parts of my invention.

Figure 3 represents a horizontal cross-sectional view, generally along the line 3—3 of Figure 1, showing the slotted cam and the pitch actuating ball.

Figure 4 represents a vertical cross-sectional view generally along the line 4—4 of Figure 2, further illustrating the cam control arrangement of Figure 3.

Figure 5 represents a view generally similar to that of Figure 3 but showing a modified form of slotted cam and ball.

Figure 6 represents a view generally similar to that of Figure 4 but showing the modified embodiment of Figure 5.

Figure 7 is a diagram illustrating the influence of the lag-drag relationship on lagging oscillations of the rotor blades.

In the embodiment shown in Figures 1 to 4 of the accompanying drawings, a rotor hub 5 is mounted on a drive shaft 6 to which it is rigidly secured by bolts or other suitable means (not shown).

The hub 5 is provided with rotor blades only one of which is shown and described herein; it being understood that the other two blades and associated elements are identical with the described blade in every respect.

Formed integrally with the hub 5 are spaced, apertured pivot lugs 7 which are adapted to receive a generally horizontally extending pivot pin 8 in suitable anti-friction bearings or bushings. The pin 8 passes through an eye 54 formed at the inboard end of the attachment link 9, the outboard end of which is forked and apertured, on a generally vertical axis, and is provided with ball bearings 10 supporting a generally vertical pivot pin 11, which is held in place and protected from dust by top and bottom cover plates 12 and 13 respectively.

A blade supporting spindle 14 is pivotally supported by the pin 11 which passes through an eye 55 formed on the inboard end of the spindle 14. The blade supporting spindle 14 is adapted, at its outboard end, to hold a number of ball bearings 15.

The bearings 15 are retained in place on spindle 14 by an eye-nut 16 which is screwed into a suitably threaded recess in spindle 14.

Rotatably supported on the bearings 15 is a bearing housing shell 17 which is formed at its outboard end to receive the two halves 18 and 19 of a split blade root clamp. The clamp members 18 and 19 are retained in the housing 17 by a pair of bolts 20 and nuts 21.

A tubular blade spar or root 22, which supports the airfoil blade 27, is securely held between the clamp members 18 and 19 by the clamping action of a plurality (as for example 3) of top and bottom clamp bars 23 connected at their ends by clamp bolts 24 and nuts 25.

The spar 22 is further secured against sliding out of the clamp by an annular shoulder 26 formed integrally with the spar 22 and registering with suitable annular recesses 56 and 57 in the clamp members 18 and 19.

The bearing housing 17 is slidably mounted on the bearings 15 so that in normal operation no axial thrust load can be transmitted from the blade spar 22 to the bearings 15, which serve as guides and also serve to support the weight of the blade when it is not rotating. A flange or shoulder 28 is provided on the inner end of the housing 17 as an emergency safeguard so that the bearings 15 may take up the axial load in case of failure or excessive stretch of the rod bearing; the clearance space provided between the shoulder 28 and the bearings 15 being sufficient to prevent contact in normal operation.

The axial thrust from the centrifugal force generated by the rapid rotation of the blade is transmitted to the hub through a compression tube 29, the nut 30, the tubular, multiple rod tension member 31, the clevis nut 32 and the clevis pin 33 attaching the clevis nut 32 to the eye nut 16. The inboard end of tube 29 registered with an internal annular shoulder formed in the clamp members 18 and 19, and is secured against rotation relative to the clamp by tongues 34 formed on a short sleeve 35 fixed to the tube 29.

The tension member 31 in the form here shown is a tube, externally screw-threaded at each end and slit longitudinally in its central zone to form a number of circumferentially disposed rods 36.

The outboard end of the member 31 is screwed into nut 30 and the inboard end into the clevis nut 32; the ends being locked against turning by outer and inner pins 37 and 38 respectively. The eye nut 16 is similarly locked against turning by the pin 39.

A ring support 40, surrounding shaft 6 and secured to the fixed structure of the aircraft, serves as a mounting for a gimbal ring assembly shown particularly in Figure 1 and comprising inner gimbal ring 41, outer gimbal ring 42, outermost rotatable ring 43, balls 44 to permit rotation of ring 43 about ring 42, and diametrically opposed interconnecting pivots 58 tiltably supporting ring 41 on support 40 and diametrically opposed interconnecting pivots 45 tiltably supporting ring 42 on ring 41; the pivots 58 and 45 being at right angles to each other whereby the outer gimbal ring 42 and its associated rotatable ring 43 are free to tilt in any plane relative to the ring support 40.

A pair of control arms 46 are bolted securely to the under-side of ring 42 in line with the pins 58 and 45 and are fitted to connect with universal rod-ends 47 which receive their control displacements, through suitable linkage not shown, from the manual controls at the disposal of the pilot.

As shown in Figures 1 and 2, the outer rotatable ring 43 is constrained to turn at all times with the rotor hub 5 by interconnecting driving mechanism comprising a spider 48 keyed to the top of the hub 7, generally horizontal arms 49 pivotally attached to the spider 48 by pins 59 and generally vertical links 50 pivotally connected to the outboard ends of the arms 49 by pins 60 and universally attached at their lower ends to the ring 43, as for example by the ball and socket joints 61.

Control of blade pitch is effected by means of an arm 51 bolted to the bearing housing 17 and which is thus a rigid part of the blade assembly. The arm 51 terminates in a ball end 52 which registers with a slotted cam formed in the face of a pad 53 forming an integral part of the vertical link 50. A generally vertical pin 62 fixedly connects the ball end 52 to the main portion of the arm 51.

The airfoil blade 27 is fitted with spaced ribs 63 which are rigidly supported on the spar 22 by flanged collars 64.

In operation, the ring 43 is caused to rotate always with the hub but its plane is free to tilt in any direction in response to the combined displacements of the two control rods 47. Thus, when the plane of the ring 43 is tilted, any point on its periphery receives an oscillatory, generally vertical motion which it imparts through the link 50 and pad 53 to the arm 51, thereby causing the blade to undergo a corresponding pitch oscillation.

That is, the vertical oscillation of the link 50, is converted to a rotation of the spar 22 about its axis; an upward movement of the link 50 producing a rotation of the spar 22 to increase the pitch or angle of attack of the blade 27 and vice versa.

As the pitch of the several blades is cyclicly varied during rotation of the rotor, the attitude of the aircraft is changed in the manner known in the art.

The face of the pad 53 is disposed generally tangent to the arc of a circle described about the center of the vertical blade pivot 11, thus maintaining correct registering relationship between the slotted cam in the pad 53 and the ball end 52 of the arm 51 regardless of the angular position of the blade 27 within the limits of lag between which it may move. Likewise, the center of the ball end 52 is preferably located approximately in the extension of the axis of the horizontal pivot pin 8, its position being therefore little altered by a change in vertical angular position of the blade 27.

As shown particularly in Figures 3 and 4, the slotted cam 68 in the pad 53 is preferably formed at a slight angle to a plane normal to the link 50, the slope being carefully determined to give the best rotor stability and smoothness in accordance with the principles explained hereinafter.

In the modification illustrated in Figures 5 and 6, the cam slot angle may be made adjustable by forming a slot 69 in a separate plate 66 bolted to the face of the pad 53 by means of the bolts 65. The slots 67, disposed in circular arcs described about the center of the plate 66, permit of adjustment of the cam slot angle by rotation of the plate; the bolts 65 serving to loosen the plate for adjustment when backed off and to hold it securely at the desired angle when tightened.

It will be noted that a lag motion of the blade 27, that is in a clockwise direction of rotation about the pivot 11, causes the ball 52 to move generally radially outward. If the cam slot formed in the pad 53 were horizontally disposed no change of blade pitch would result. If, however, the cam is disposed with its outer end sloped up from the inner end, as shown in Fig. 5, the blade lag causes the ball 52 to move to the right (Fig. 5) and the slope of the cam causes it to rise, thus in turn increasing the pitch of the blade 27. Thus by adjustment of the slope angle of the cam plate 66 it is possible readily to set the lag-pitch relationship at any value which is found to be advantageous.

The parallelogram type of motion herein provided for the control actuation of the control links 50 assures that the slope of the cam slots remains substantially constant regardless of the amount of control displacement, a very important feature in assuring smooth rotor operation throughout the control range.

Preferably, the center of the ball 52 is placed substantially in line with the axis of the flapping pivot 8 when the blade axis is at right angles to the flapping axis, as shown in Fig. 1. It is readily seen that flapping, or upward swinging, of the blade then causes no displacement of the ball 52 and no pitch change is caused by flapping. However if, the blade is lagged with relation to the right angle position described above, the ball 52 is moved outwardly from the flap axis and thereafter it is depressed in relation to the blade by upward flapping motion. That is, pitch is reduced by upward flapping when the blade is lagged. However, it is apparent that when a blade is lagged and is then flapped upward, an increase in relative angle-of-attack or pitch occurs since, with the blade in lagged position, flapping of the link 9 necessarily causes tilting of the rotor blade about its spar 22. This effect is opposite in direction to and therefore compensatory of the mechanical lag-flap-pitch interconnection described above. Furthermore it has been found that, with the arrangement illustrated, the quantitative values of the two above effects are precisely equal and opposite. Their combined consequence is therefore zero and the arrangement is seen to have the merit of assuring that the relative angle of attack of the blades is entirely unaffected by flap angle. This is a result of great importance in assuring smoothness of operation in all flight conditions. If, however, it should be desired to provide a certain amount of change of pitch with flap, this can readily be provided by setting the initial position of ball 52 either inboard or outboard, depending on whether increase or decrease of pitch with upward flap is desired, with relation to the flap axis. The arrangement shown is adjustable over a small range by turning the pin 62 in its socket and clamping it in the desired place. The flap-pitch interconnection so obtained then remains unaffected by lag.

The lag-pitch relationship has been found in practice to have a profound influence on the operational characteristics of articulated lifting rotors, particularly when power driven as in the helicopter. One of the most important of their influences is that of amplifying or absorbing lag oscillation of the blades. This action is illustrated diagrammatically in Fig. 7. The wave curve drawn in a solid line represents the oscillatory motion of a blade which has been set swinging by some external influence. The horizontal scale represents displacement in time or rotor rotation, one complete period of swing being shown. It is further assumed that the interlinkage is such that pitch is increased with lag. Then while the blade is traversing the first half-cycle, that is the lagged half-cycle, the pitch is greater than the mean value. Since the air drag of the blade increases with pitch, blade drag is also greater than mean during the first half-cycle. The increased drag force induces an acceleration of the blade in the direction of further lag. The maximum induced lag velocity must be reached at the end of the induced lag accelerative period. Consequently the maximum induced lagging velocity comes at the mid-point of the cycle. Since the motion is necessarily substantially harmonic in form, the point of maximum induced lagging velocity must be in the center of the region of induced lagging velocity. Furthermore the maximum induced lag displacement must occur at the end of the region of induced lagging velocity, that is in the center of the second half-cycle. Applying these principles, the form of the curve of induced oscillatory tendency is readily constructed and is shown by the dotted curve. It is seen that this curve at all points opposes the original oscillation and tends to cause it to die out. The important and novel conclusion is thus reached that increase of pitch with lag has anti-oscillatory and consequently anti-resonant effects. Conversely, decrease of pitch with lag has the effect of amplifying oscillations and may in fact, if pronounced enough to overcome friction and other inhibitory influence, lead to destructive self-resonance.

A second advantageous consequence of increase of pitch with lag has been observed to be important in the case of helicopter rotors. It has been common practice to control helicopters in substantially vertical motion by opening and closing the engine throttle. When, however, the pitch is not changed at the same time the response has been found to be sluggish and uncertain due in part to the inertial effect of the rotor mass. Increase of pitch with lag automatically counteracts this adverse characteristic since, for example, when the throttle is opened the hub instantly turns in relation to the blades, owing to the increased torque movement, thus causing relative lag increase. The consequent increase of pitch insures a rapidity of lift response that is not obtained when the rotor inertia must first be overcome.

A third advantage which has also been found in practice to be important results also from the anti-oscillatory characteristics of increase of pitch with lag. It has been found that stability of position vertically is greatly affected by the lag-pitch relation. Thus, a helicopter having pitch uninfluenced by lag has been found to fluctuate erratically up and down when hovering with small forward velocity. This tendency is overcome to a remarkable degree by interlinking pitch with lag so that they increase together, while the opposite effect results from a reversal of the lag-pitch relation. The ready explanation is that the vertical instability results from more or less erratic engine-forced torsional oscillations of the rotor hub relative to the blades. The anti-oscillational activity of suitable lag-pitch interlinkage combats these oscillations and serves to a considerable degree to make the rotor inertia as a whole available as an engine fly-wheel.

From the above discussion it would seem that any amount of pitch increase with lag should be beneficial in the operation of rotors. This, however, is not the case owing to the fact that excessive increase of pitch with lag causes instability of rotational speed in power driven rotors. Thus, increase of pitch increases drag which decreases rotational speed, which in turn causes increase of lag and again increase of pitch. Thus the rotor may slow down and pitch increase until the mechanical limitations are reached. Or again it may speed up until the pitch has decreased nearly to zero. As this totally unstable combination is approached by increasing the lag-pitch effect, partial instability is encountered and the rotors are subject to erratic fluctuations of rotational speed which are very detrimental to satisfactory operation.

Thus it has been found that the advantageous range of lag-pitch effect is confined to more or less definite bounds, one of which is substantially that of a zero lag-pitch relation and the other a value which varies with the proportions of the rotor but which is in all cases far less than the rate of change of pitch with lag which has been previously proposed for the purpose of providing a transition from a pitch suitable for power driven operation to one suitable for auto-rotative emergency landing. The range of optimum performance is still more restricted. This is the reason why consistently good results have not been attained with conventional control mechanism employing link attachments to the blades, or with other connections having the characteristics of sharply changing lag-pitch relation in the various operating positions, such as have been heretofore proposed and employed.

Some variation of the lag-pitch relation is however permissible and the cam slots of my invention may therefore, if desired, be given a certain amount of curvature or change of slope without departing from the essence of my invention, although in practice such curvature has in the past been found to be less advantageous than the straight slots illustrated and described herein.

While for purposes of illustration, I have described my novel pitch control construction in connection with a three-bladed airscrew, it is obvious that it could be applied equally well to an airscrew having any other number of blades. According to the present invention there is superimposed upon the blades, during cyclic pitch change thereof, a pitch change generally equal in magnitude but opposite in direction to the change in the relative angle-of-attack of the blades which takes place as a component of up-and-down flapping when in lagged position.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, what I claim as new and desire to secure by Letters Patent is:

1. In a rotor for rotating-wing aircraft, said rotor having a hub and airfoil blades mounted thereon with freedom to flap, freedom to lag and freedom to change pitch, and having mechanism for cyclicly changing the pitch of said blades for attitude control of said aircraft, and means forming part of the pitch-changing mechanism for superimposing upon the blades a pitch change generally equal in magnitude but opposite in direction to the change in the relative pitch of the blades which takes place as a component of up-and-down flapping when in lagged position, while substantially eliminating superimposed pitch change during unlagged flapping of said blades.

2. In a rotor for rotating-wing aircraft, said rotor having a hub and airfoil blades mounted thereon with freedom to flap, freedom to lag and freedom to change pitch, and having mechanism for cyclicly changing the pitch of said blades for attitude control of said aircraft, and means including a cam and a cam-follower forming part of the pitch-changing mechanism for superimposing upon the blades a pitch change generally equal in magnitude but opposite in direction to the change in the relative pitch of the blades which takes place as a component of up-and-down flapping when in lagged position, said cam and cam-follower being substantially inoperative to superimpose pitch change during unlagged flapping of said blades.

3. In a rotor for rotating-wing aircraft, said rotor having a hub and airfoil blades mounted thereon with freedom to change pitch, each of said blades having a flapping pivot and a lagging pivot, said rotor having mechanism for cyclicly changing the pitch of said blades for attitude control of said aircraft, and means forming part of the pitch-changing mechanism for superimposing upon the blades a pitch change generally equal in magnitude but opposite in direction to the change in the relative pitch of the blades which takes place as a component of up-and-down flapping when in lagged position, while substantially eliminating superimposed pitch change during unlagged flapping of said blades.

4. In a rotor for rotating-wing aircraft, said rotor having a hub and airfoil blades mounted thereon with freedom to change pitch, each of said blades having a flapping pivot and a lagging pivot, said rotor having mechanism for cyclicly changing the pitch of said blades for attitude control of said aircraft, means for neutralizing the pitch changes resulting from lagged-flapping of said blades, said last-mentioned means including a pitch-arm attached to each of said blades with torsional rigidity relative thereto, said pitch-arm terminating in an actuating ball, said ball being closely adjacent the extended axis of the flapping pivot of its blade when said blade is in unlagged position, said ball being displaced from the extended axis of said flapping pivot when said blade is in lagged position.

5. A lift rotor for rotating-wing aircraft, said rotor comprising a rotatably mounted hub, a plurality of generally radially-extending blade-articulating stubs carried by said hub, each of said stubs having a flapping pivot at its inner end, whereby said stubs are free to flap up-and-down relative to said hub, an airfoil blade pivotally secured to the outer end of each of said stubs whereby said blade is capable of lagging displacement to-and-fro relative to said stub, mechanism for cyclicly changing the pitch of said blades for attitude control of said aircraft, and means forming part of the pitch-changing mechanism for superimposing upon the blades a pitch change generally equal in magnitude but opposite in direction to the change in the relative pitch of the blades which takes place as a component of flapping of said blades in lagged position, while substantially eliminating superimposed pitch change during unlagged flapping of said blades.

6. A lift rotor for rotating-wing aircraft, said rotor comprising a rotatably mounted hub, a plurality of generally radially-extending blade-articulating stubs carried by said hub, each of said stubs having a flapping pivot at its inner end, whereby said stubs are free to flap up-and-down relative to said hub, an airfoil blade pivotally secured to the outer end of each of said stubs whereby said blade is capable of lagging displacement to-and-fro relative to said stub, mechanism for cyclicly changing the pitch of said blades for attitude control of said aircraft, and means for neutralizing the pitch changes resulting from lagged-flapping of said blades, said last-mentioned means including parallel motion linkage forming part of the pitch-changing mechanism and being operative during lagged flapping of said blades to superimpose pitch change thereon.

7. A lift rotor for rotating-wing aircraft, said rotor comprising a rotatably mounted hub, a plurality of generally radially-extending blade-articulating stubs carried by said hub, each of said stubs having a flapping pivot at its inner end, whereby said stubs are free to flap up-and-down relative to said hub, an airfoil blade pivotally secured to the outer end of each of said stubs whereby said blade is capable of lagging displacement to-and-fro relative to said stub, mechanism for cyclicly changing the pitch of said blades for attitude control of said aircraft, and means for neutralizing the pitch changes resulting from lagged-flapping of said blades, said last-mentioned means including a pitch-arm attached to each of said blades, said pitch-arm terminating in an actuating ball, said ball being closely adjacent the extended axis of the flapping pivot of its blade when said blade is in its normal position, said ball displaced from the extended axis of said flapping pivot when said blade is in lagged position.

8. A lift rotor for rotating-wing aircraft, said rotor comprising a rotatably mounted hub, a plurality of generally radially-extending blade-articulating stubs carried by said hub, each of said stubs having a flapping pivot at its inner end, whereby said stubs are free to flap up-and-down relative to said hub, an airfoil blade pivotally secured to the outer end of each of said stubs whereby said blade is capable of lagging displacement to-and-fro relative to said stub, mechanism for cyclicly changing the pitch of said blades for attitude control of said aircraft, said pitch-changing mechanism including a gimbal ring tiltably mounted about said hub and linkage connecting each of said blades to said gimbal ring for changing the pitch of said blades responsive to tilt of said gimbal ring, and means for neutralizing the pitch changes resulting from lagged-flapping of said blades, said last-mentioned means including parallel-linkage mechanism forming part of the pitch-changing mechanism and being operative during lagged-flapping of said blades to superimpose pitch change thereon.

9. A lift rotor for rotating-wing aircraft, said rotor comprising a rotatably mounted hub, a plurality of generally radially-extending blade-articulating stubs carried by said hub, each of said stubs having a flapping pivot at its inner end, whereby said stubs are free to flap up-and-down relative to said hub, an airfoil blade pivotally secured to the outer end of each of said stubs, whereby said blade is capable of lagging displacement to-and-fro relative to said stub, mechanism for cyclicly changing the pitch of said blades for attitude control of said aircraft, said pitch-changing mechanism including a gimbal ring tiltably mounted about said hub and means connecting each of said blades to said gimbal ring for changing the pitch of said blades responsive to tilt of said gimbal ring, and means for neutralizing the pitch changes resulting from lagged-flapping of said blades, said last-mentioned means including a pitch-arm attached to said blade and terminating in a ball and parallel motion linkage operatively connected to said ball and forming part of each connecting means for superimposing upon the blades a pitch change generally equal in magnitude but opposite in direction to the angle-of-attack change resulting from lagged-flapping of said blades.

10. A lift rotor for rotating-wing aircraft, said rotor comprising a rotatably mounted hub, a plurality of generally radially-extending blade-articulating stubs carried by said hub, each of said stubs having a flapping pivot at its inner end, whereby said stubs are free to flap up-and-down relative to said hub, an airfoil blade pivotally secured to the outer end of each of said stubs whereby said blade is capable of lagging displacement to-and-fro relative to said stub, mechanism for cyclicly changing the pitch of said blades for attitude control of said aircraft, said pitch-changing mechanism including a gimbal ring tiltably mounted about said hub and linkage connecting each of said blades to said gimbal ring for changing the pitch of said blades responsive to tilt of said gimbal ring, and means for neutralizing the pitch changes resulting from lagged-flapping of said blades, said last-mentioned means including a ball and parallel motion connection forming part of each linkage, said ball being closely adjacent the extended axis of the flapping pivot of its blade when said blade is in unlagged position, said ball being displaced from the extended axis of said flapping pivot when said blade is moved to lagged position.

11. A lift rotor for rotating-wing aircraft, said rotor comprising a rotatably mounted hub, a plurality of generally radially-extending blade-articulating stubs carried by said hub, each of said stubs having a flapping pivot at its inner end, whereby said stubs are free to flap up-and-down relative to said hub, an airfoil blade pivotally secured to the outer end of each of said stubs, whereby said blade is capable of lagging displacement to-and-fro relative to said stub, mechanism for cyclicly changing the pitch of said blades for attitude control of said aircraft, said pitch-changing mechanism including a gimbal ring tiltably mounted about said hub, a plurality of links carried by said gimbal ring, and a pitch-changing arm interconnecting each of said blades to a link, said links being adapted for generally vertical oscillation during rotation of said rotor when said gimbal ring is tilted thereby to effect cyclic pitch change of said blades, and means for neutralizing the pitch changes resulting from lagged-flapping of said blades, said last-mentioned means including means forming part of the pitch-changing mechanism for superimposing upon the blades a pitch change generally equal in magnitude but opposite in direction to pitch changes resulting from flapping of said blades in lagged position, while substantially eliminating superimposed pitch change during unlagged flapping of said blades.

12. A lift rotor for rotating-wing aircraft, said rotor comprising a rotatably mounted hub, a plurality of generally radially-extending blade-articulating stubs carried by said hub, each of said stubs having a flapping pivot at its inner end, whereby said stubs are free to flap up-and-down relative to said hub, an airfoil blade pivotally secured to the outer end of each of said stubs whereby said blade is capable of lagging displacement to-and-fro relative to said stub, mechanism for cyclicly changing the pitch of said blades for attitude control of said aircraft, said pitch-changing mechanism including a gimbal ring tiltably mounted about said hub, a plurality of links carried by said gimbal ring, and a pitch-changing arm connecting each of said blades to a link, said links being adapted for generally vertical oscillation during rotation of said rotor when said gimbal ring is tilted thereby to effect cyclic pitch change of said blades, and means for neutralizing pitch changes resulting from lagged-flapping of said blades, said last-mentioned means including parallel motion linkage intermediate each pitch-changing arm and its link and operative during lagged-flapping of said blades to superimpose pitch change thereon.

13. A lift rotor for rotating-wing aircraft, said rotor comprising a rotatably mounted hub, a plurality of generally radially-extending blade-articulating stubs carried by said hub, each of said stubs having a flapping pivot at its inner end, whereby said stubs are free to flap up-and-down relative to said hub, an airfoil blade pivotally secured to the outer end of each of said stubs whereby said blade is capable of lagging displacement to-and-fro relative to said stub, mechanism for cyclicly changing the pitch of said blades for attitude control of said aircraft, said pitch-changing mechanism including a gimbal ring tiltably mounted about said hub, a plurality of links carried by said gimbal ring, and a pitch-changing arm connecting each of said blades to a link, said links being adapted for generally vertical oscillation during rotation of said rotor when said gimbal ring is tilted thereby to effect cyclic pitch change of said blades, and means for neutralizing pitch changes resulting from lagged-flapping of said blades, said last-mentioned means including a ball formed on the inboard end of each connecting arm and parallel motion linkage intermediate each ball and its link, said ball being closely adjacent the extended axis of the flapping pivot of its blade when said blade is in unlagged position relative to said hub, said ball being displaced from the extended axis of its flapping pivot when its blade is lagged.

14. A lift rotor for rotating-wing aircraft, said rotor comprising a rotatably mounted hub, a plurality of radially-extending blade-articulating stubs carried by said hub, each of said stubs having a flapping pivot at its inner end, whereby said stubs are free to flap up-and-down relative to said hub, an airfoil blade having a root and being pivotally secured at its root to the outer end of each of said stubs, whereby said blade is capable of lagging displacement to-and-fro relative to said stub, a bearing adjacent the root of each of said blades, whereby said blade is capable of being turned on its longitudinal axis for change of pitch, a pitch arm rigidly secured to the root of each blade and extending inwardly therefrom and terminating, when the blade is in unlagged position, generally in the extended axis of the flap pivot, parallel motion linkage engaging the inboard end of said pitch arm, said linkage being so disposed that with lagging motion of the blade the inboard end of the pitch arm is constrained to move substantially in a flat plane surface, and control linkage associated with the parallel motion linkage for imparting up-and-down motion to the pitch arm for providing pitch control.

15. A lift rotor for rotating-wing aircraft, said rotor comprising a rotatably mounted hub, a plurality of generally radially-extending stubs carried by said hub, each of said stubs having a flapping pivot at its inner end, whereby said stubs are free to flap up-and-down relative to said hub, an airfoil blade mounted at the outer end of each of said stubs with freedom to lag and freedom to change pitch, a pitch-change arm for each blade, the outer end of each arm being operatively connected to its blade, the inner end of said arm terminating generally in the extended axis of the flapping pivot when the blade is in unlagged position, parallel motion linkage engaging the inner end of said pitch-change arm and being adapted to move the inner end of said pitch-change arm substantially in a flat plane surface upon lagging motion of said blade, and means associated with said parallel motion linkage for cyclicly moving the pitch-change arms during rotation of said rotor thereby cyclicly to vary the pitch of said blades for attitude control of said aircraft.

16. An aircraft lift rotor including a revolubly supported hub, a plurality of generally radially-extending blade-articulating stubs pivotally secured to said hub at their inner ends for up-and-down displacement, an airfoil blade pivotally secured to the outer end of each of said stubs for to-and-fro lagging displacement of the blade, pivoting mechanism for pitch changing displacement of said blade, pitch actuating means extending from said blade inwardly approximately to the axis of the up-and-down displacement pivot, and mechanism associated with said pitch actuating means correlating the pitch-varying displacement of said blade with the to-and-fro displacement thereof.

HAVILAND H. PLATT.

REFERENCES CITED

The following references are of record in the file of this patent:

UNITED STATES PATENTS

| Number | Name | Date |
|---|---|---|
| 1,893,395 | Breguet | Jan. 3, 1933 |
| 1,919,089 | Breguet et al. | July 18, 1933 |
| 1,927,966 | Vaughn | Sept. 26, 1933 |
| 1,986,709 | Breguet et al. | Jan. 1, 1935 |